US012547367B2

(12) United States Patent
Wu et al.

(10) Patent No.: US 12,547,367 B2
(45) Date of Patent: Feb. 10, 2026

(54) SOLUTION TO AVOID DUPLICATED APP NOTIFICATION SOUNDS

(71) Applicant: CITRIX SYSTEMS, INC., Fort Lauderdale, FL (US)

(72) Inventors: Hao Wu, Nanjing/Jiangsu (CN); Taodong Lu, Nanjing/Jiangsu (CN); Bo Zang, Nanjing/Jiangsu (CN); Shihao Qian, Nanjing/Jiangsu (CN)

( * ) Notice: Subject to any disclaimer, the term of this patent is extended or adjusted under 35 U.S.C. 154(b) by 651 days.

(21) Appl. No.: 17/823,617

(22) Filed: Aug. 31, 2022

(65) Prior Publication Data

US 2024/0036807 A1 Feb. 1, 2024

Related U.S. Application Data

(63) Continuation of application No. PCT/CN2022/108312, filed on Jul. 27, 2022.

(51) Int. Cl.
*G06F 17/00* (2019.01)
*G06F 3/16* (2006.01)
*H04L 65/1089* (2022.01)
*H04L 65/80* (2022.01)

(52) U.S. Cl.
CPC .......... *G06F 3/165* (2013.01); *H04L 65/1089* (2013.01); *H04L 65/80* (2013.01)

(58) Field of Classification Search
CPC ...... G06F 3/165; H04L 65/1089; H04L 65/80

USPC .......................................................... 700/94
See application file for complete search history.

(56) References Cited

U.S. PATENT DOCUMENTS

| 2004/0008635 | A1* | 1/2004 | Nelson | H04N 7/152 |
| | | | | 709/204 |
| 2015/0179186 | A1* | 6/2015 | Swierk | G10L 25/60 |
| | | | | 704/276 |

OTHER PUBLICATIONS

Jacktrip Server: Setup, Independent Channel Mixing, Integrated Launch (Year: 2021).*

* cited by examiner

*Primary Examiner* — Paul C Mccord

(57) ABSTRACT

A computing system includes a virtual server to provide a remote desktop session that includes at least one remote app configured to generate notification sounds, and a client computing device to provide a local desktop session that includes at least one local app configured to generate notification sounds. The client computing device accesses the remote desktop session and launches one of the remote apps, and launches one of the local apps. The launched local app is the same as the launched remote app. The local and remote desktop sessions include respective local and remote sound controllers to intercept notification sounds generated by the local and remote apps. The local and remote sound controllers operate based on predetermined muting criteria so that one of the notification sounds is muted to avoid duplicated app notification sounds.

20 Claims, 10 Drawing Sheets

SOLUTION TO AVOID DUPLICATED APP NOTIFICATION SOUNDS

RELATED APPLICATIONS

This application is a continuation of PCT application serial no. PCT/CN2022/108312 filed Jul. 27, 2022, which is hereby incorporated herein in its entirety by reference.

TECHNICAL FIELD

The present disclosure relates to computing systems, and more particularly, to a computing system that avoids duplicated app notification sounds.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer.

Using client-server technology, a remote desktop may be stored in and administered by a remote server, rather than in the local storage of a computing device. The computing device accesses the remote desktop in a remote computing session with the server. The remote computing session allows a user to access resources. The resources, for example, include SaaS and web apps, desktops, files and data.

SUMMARY

A computing system includes a virtual server and a client computing device. The virtual server is configured to provide a remote desktop session based on a remote operating system that includes a remote volume mixer and a remote sound controller, with the remote desktop session providing at least one remote app configured to generate notification sounds for the remote volume mixer.

The client computing device is configured to provide a local desktop session based on a local operating system that includes a local volume mixer and a local sound controller, with the local desktop session providing at least one local app configured to generate notification sounds for the local volume mixer.

The client computing device is further configured to access the remote desktop session and launch one of the at least one remote apps, launch one of the at least one local apps, with the launched local app being the same as the launched remote app, and intercept by the local sound controller a notification sound generated by the launched local app while the remote sound controller is also intercepting a corresponding notification sound generated by the launched remote app. The local and remote sound controllers are each configured to operate based on predetermined muting criteria so that one of the notification sounds is muted at the local or remote volume mixer in order to avoid duplicated app notification sounds.

The predetermined muting criteria may be based on determining which one of the local and remote apps is operating in an active session and which one of the local and remote apps is operating in an inactive session, with the notification sound being muted for the inactive session.

A foreground window corresponds to the active session and a background window corresponds to the inactive session. The local sound controller may be used to determine if the local app is in the foreground window or the background window while the remote sound controller is being used to determine if the remote app is in the foreground window or the background window.

The predetermined muting criteria may be based on determining which one of the local and remote apps triggered the notification sound first, with the notification sound being muted for the app that triggered the notification sound second.

The local sound controller may be used to determine a time when the notification sound was triggered by the local app while the remote sound controller is used to determine a time when the notification sound was triggered by the remote app. The local and remote sound controllers coordinate the respective times with one another to determine which app triggered the notification sound first.

The client computing device may further include a user interface (UI) for a user to determine which of the at least one local and remote apps are to be muted when the same app is launched in the local and remote desktop sessions.

The client computing device may be further configured to determine that the local and remote apps were launched using the same user account login before the local and remote sound controllers are operated based on the predetermined muting criteria.

The client computing device may be further configured to operate the local sound controller to query a log of the local app to determine a current user of the local app while the remote sound controller queries a log of the remote app to determine a current user of the remote app. A comparison of the current users is made by one of the sound controllers to determine that the same user account login was used to launch the local and remote apps.

The client computing device may be further configured to operate the local sound controller to query packets of the local app to determine a current user of the local app while the remote sound controller queries packets of the remote app to determine a current user of the remote app. A comparison of the current users is made by one of the sound controllers to determine that the same user account login was used to launch the local and remote apps.

Another aspect is directed to a client computing device operating in the computing system as described above. The client computing device includes a memory and a processor coupled to the memory. The processor provides a local desktop session based on a local operating system that includes a local volume mixer and a local sound controller, with the local desktop session providing at least one local app configured to generate notification sounds for the local volume mixer.

A remote desktop session is accessed by the processor based on a remote operating system that includes a remote volume mixer and a remote sound controller, with the remote desktop session providing at least one remote app configured to generate notification sounds for the remote volume mixer.

The processor is configured to launch one of the at least one remote apps, launch one of the at least one local apps, with the launched local app being the same as the launched remote app. The local sound controller intercepts a notification sound generated by the launched local app while the remote sound controller is also intercepting a corresponding notification sound generated by the launched remote app.

The local and remote sound controllers are each configured to operate based on predetermined muting criteria so that one of the notification sounds is muted at the local or remote volume mixer in order to avoid duplicated app notification sounds.

Yet another aspect is directed to a method for operating the client computing device as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
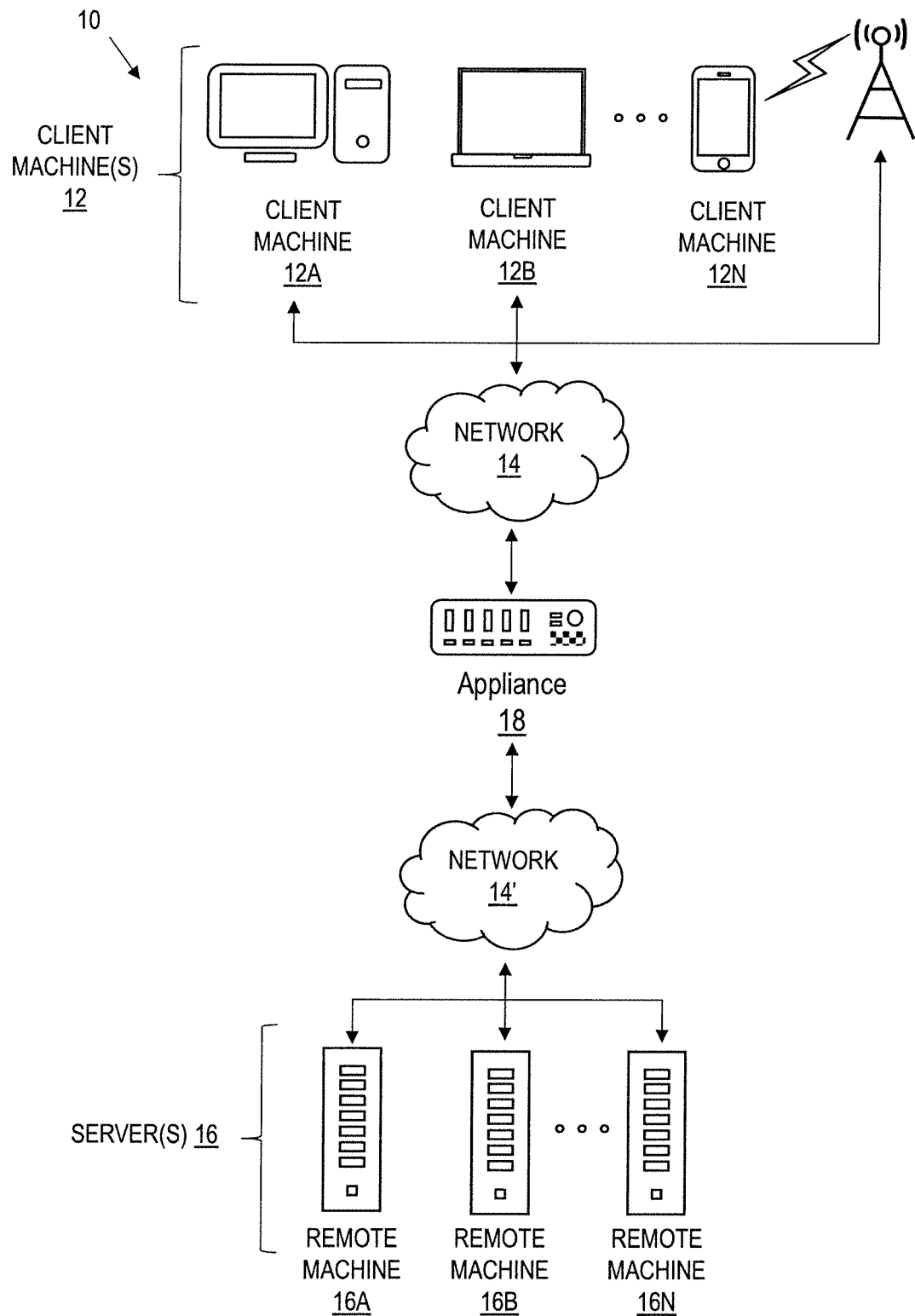
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'. In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
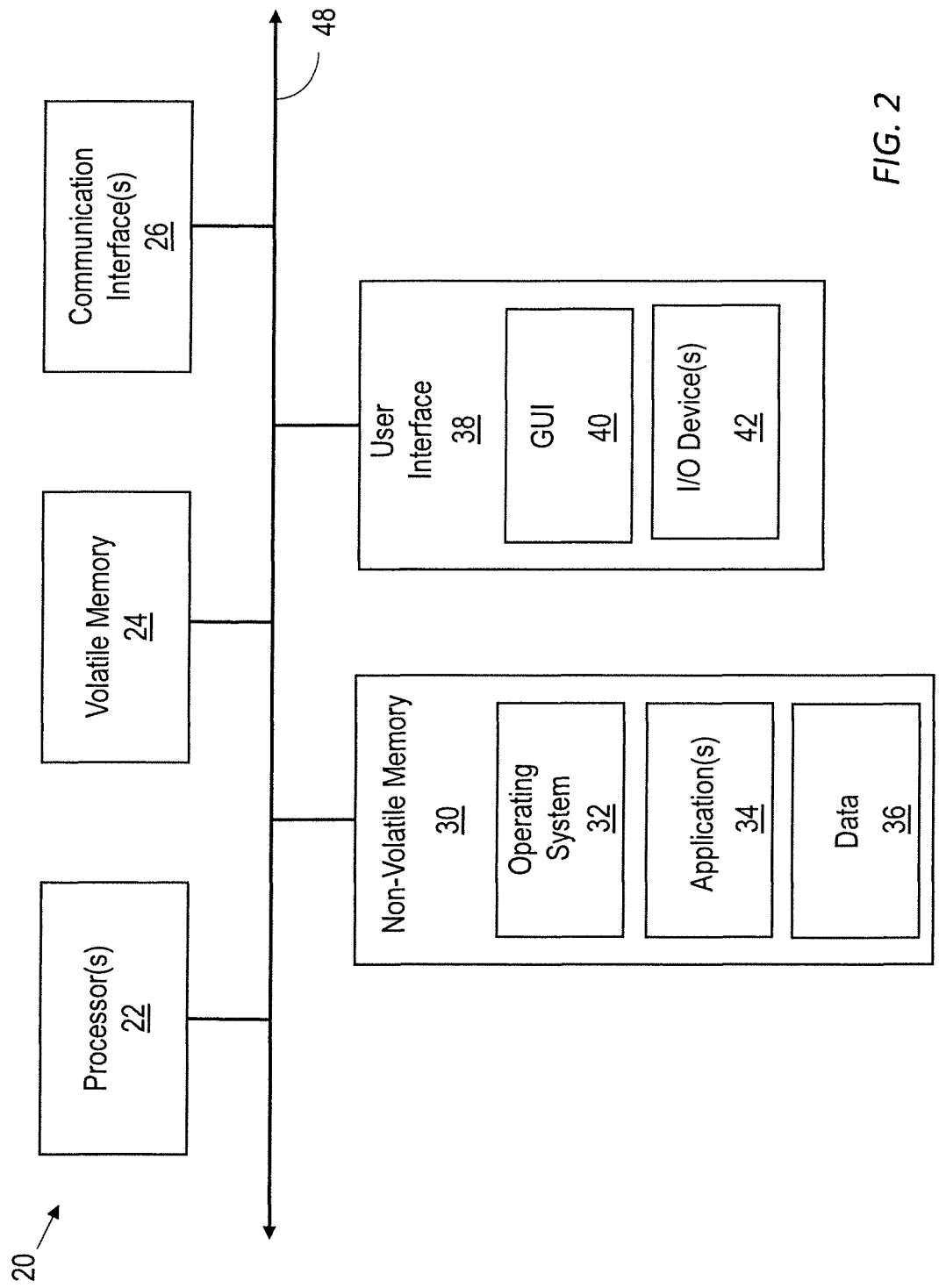
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
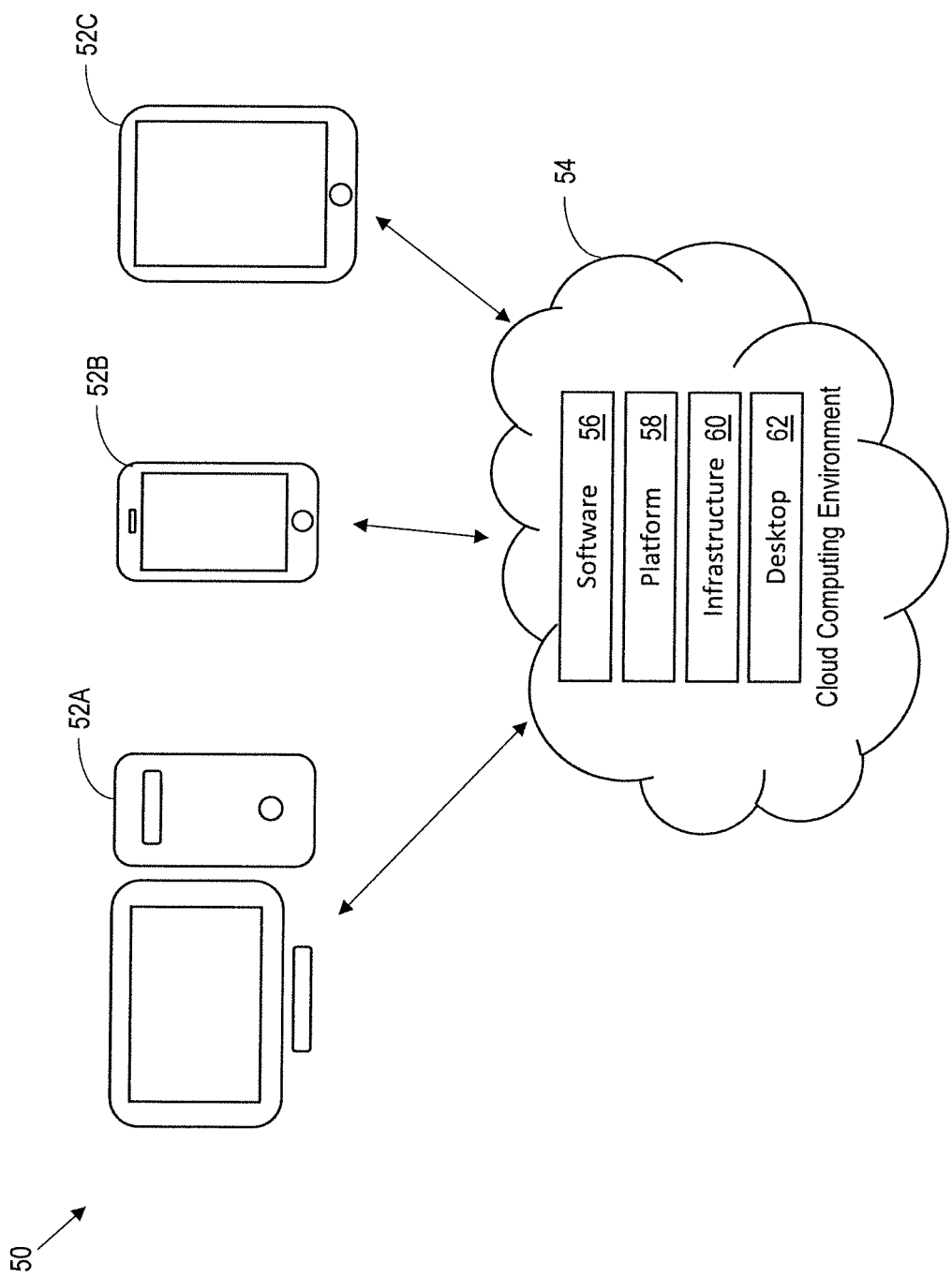
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONE-DRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
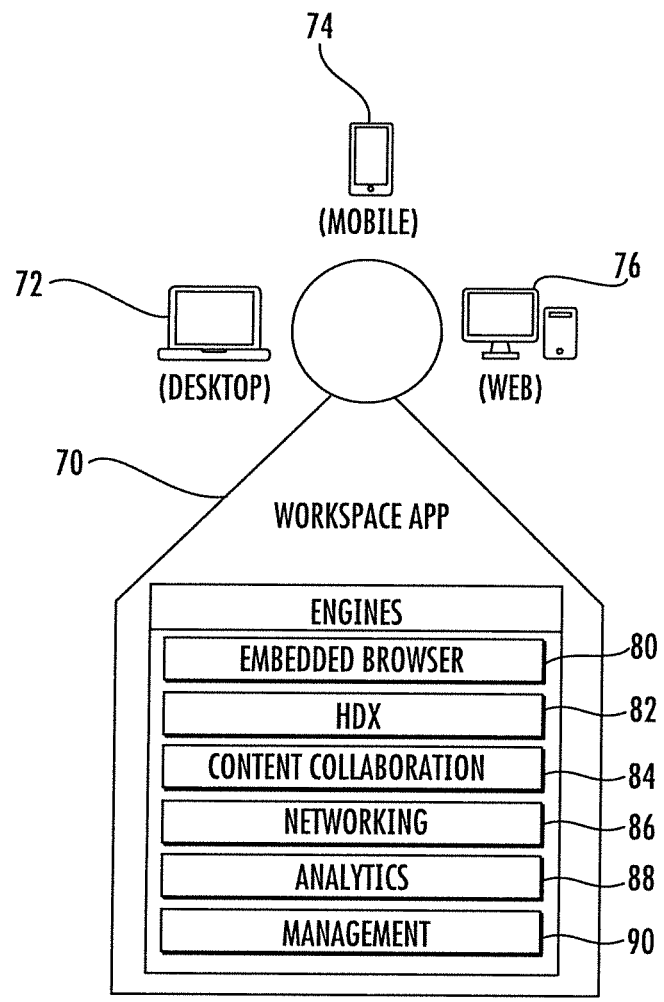
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific μ-VPN connection. A μ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
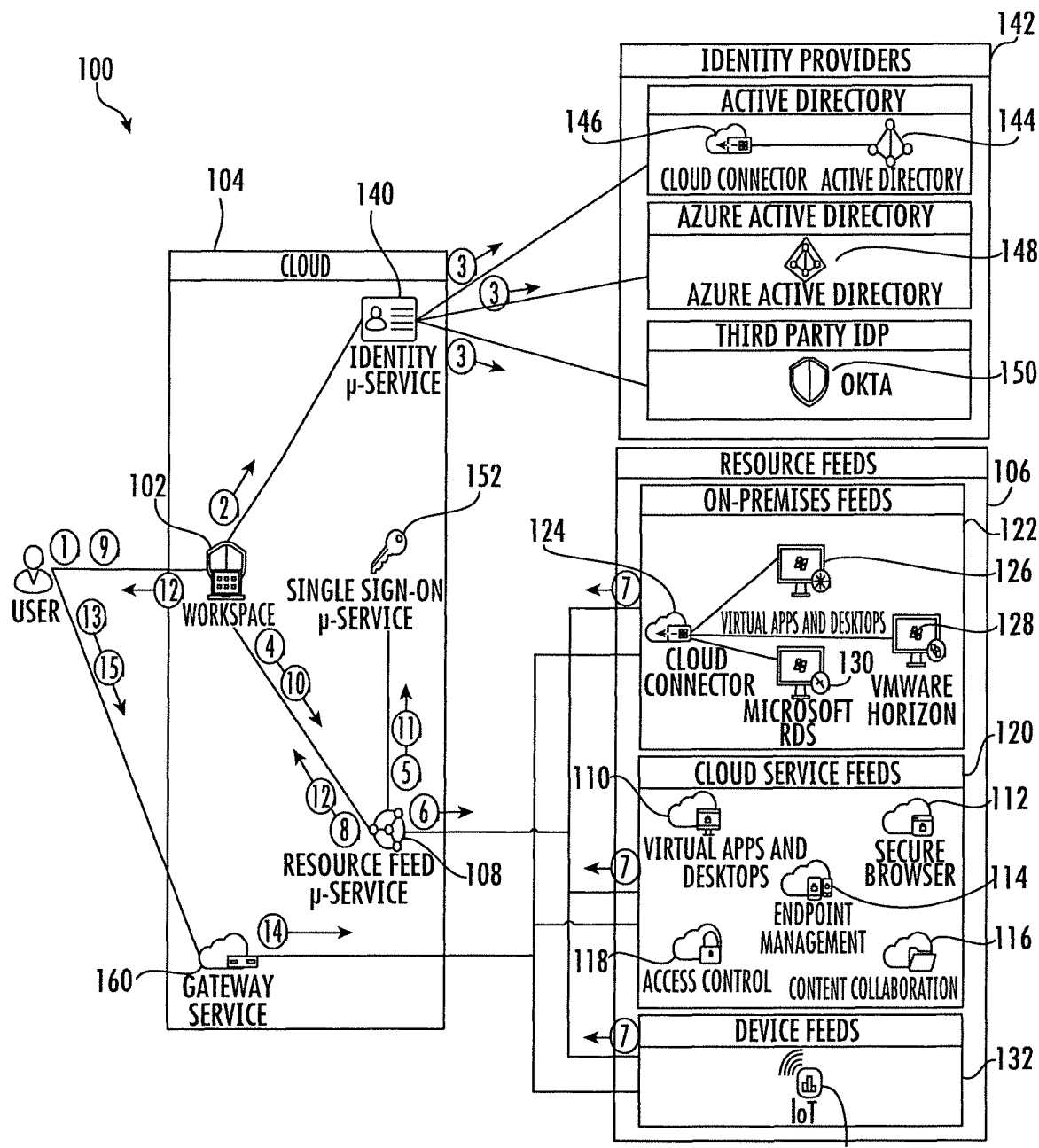
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Another aspect of the disclosure is directed to avoiding duplicated app notification sounds. This duplication occurs when the same app is launched locally on a client computing device and is also launched remotely on a remote desktop session being accessed by the client computing device.

The app may be a messaging app or an email app that generates notification sounds in response to receiving incoming messages or emails. An example messaging app is Slack as provided by Salesforce, and an example email app is Outlook as provided by Microsoft Corp.

Each time a message or email is received, two separate notification sounds are generated. One notification sound is generated by the local app and the other notification sound is generated by the remote app. A user can become annoyed when receiving duplicated app notification sounds, particularly under a chat scenario where messages are being frequently received.

Figure 6:
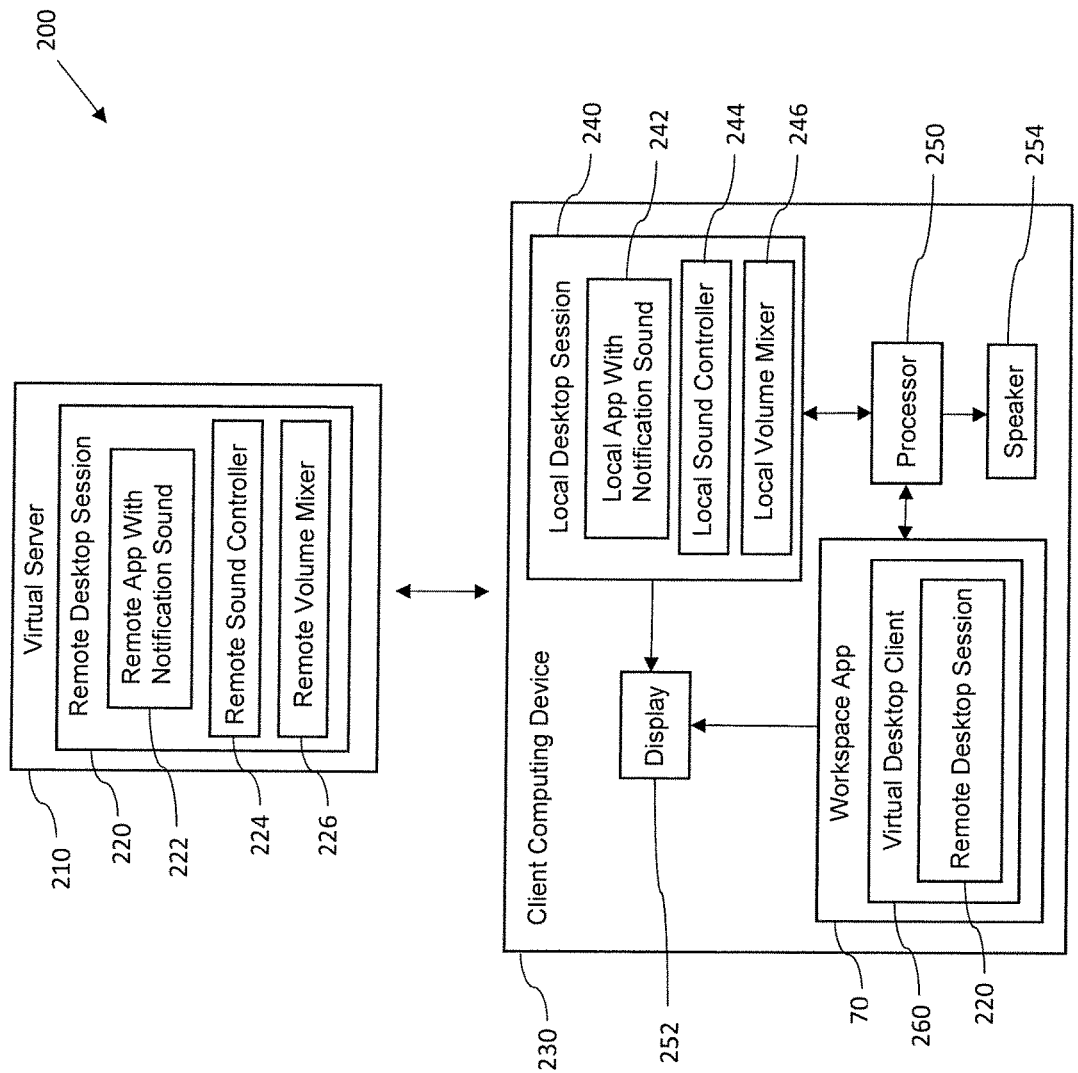
FIG. 6 is a schematic block diagram of a computing system that avoids duplicated app notification sounds according to aspects of the disclosure.

Referring now to FIG. 6, a computing system 200 configured to avoid duplicated app notification sounds will be discussed. The computing system 200 includes a virtual server 210 and at least one client computing device 230.

The virtual server 210 is configured to provide a remote desktop session 220 based on a remote operating system that includes a remote sound controller 224 and a remote volume mixer 226. The remote desktop session 220 provides at least one remote app 222 configured to generate notification sounds for the remote volume mixer 226.

The client computing device 230 is configured to provide a local desktop session 240 based on a local operating system that includes a local sound controller 244 and a local volume mixer 246. The local desktop session 240 provides at least one local app 242 configured to generate notification sounds for the local volume mixer 246.

The client computing device 230 is further configured to access the remote desktop session 220 and launch one of the remote apps 222, and to launch one of the local apps 242 via the local desktop session 240. The launched local app 242 is the same as the launched remote app 222. Each of the launched local and remote apps 242, 222 is configured to generate notification sounds as discussed above.

The local sound controller 244 intercepts a notification sound generated by the launched local app 242 that is intended for the local volume mixer 246. At the same time, the remote sound controller 242 intercepts a corresponding notification sound generated by the launched remote app 222 that is intended for the remote volume mixer 226. Both the local volume mixer 246 and the remote volume mixer 226 interface with the same speaker 254.

The remote and local sound controllers 224, 244 are configured to communicate with each other so that the notification sound is muted for one of the apps 222 or 242. The muting is based on predetermined muting criteria so that one of the notification sounds is muted at the local volume mixer 246 or at the remote volume mixer 226 in order to avoid duplicated app notification sounds.

The predetermined muting criteria is based on the same app running locally and remotely, and then silencing one of the apps. The predetermined muting criteria avoids having to compare app notification waveforms from the local and remote desktop sessions 240, 220 which may be difficult to accurately perform.

Instead, one approach for the predetermined muting criteria is based on determining which app 222, 242 is actively being used by the user. The notification sound for the app that is not being actively used will be muted, whereas the notification sound for the app that is being actively used will be received by the corresponding volume mixer for interfacing with the speaker 254.

Another approach for the predetermined muting criteria is based on determining which app 222, 242 first generated or triggered the notification sound. For example, if the notification sound is first triggered by the local app 242, then the notification sound triggered by the remote app 222 is muted.

Still referring to FIG. 6, the processor 250 accesses the remote desktop session 220 via a virtual desktop client 260 that is within the workspace app 70. The workspace app 70 is how a user gets access to their workspace resources, as discussed above. The processor 250 also interfaces with a display 252 and a speaker 254. Both the local and remote desktop sessions 240, 220 are viewed on the display 252. Notification sounds generated by the local and remote apps 242, 222 are intended to be received by the same speaker 254.

Figure 7:
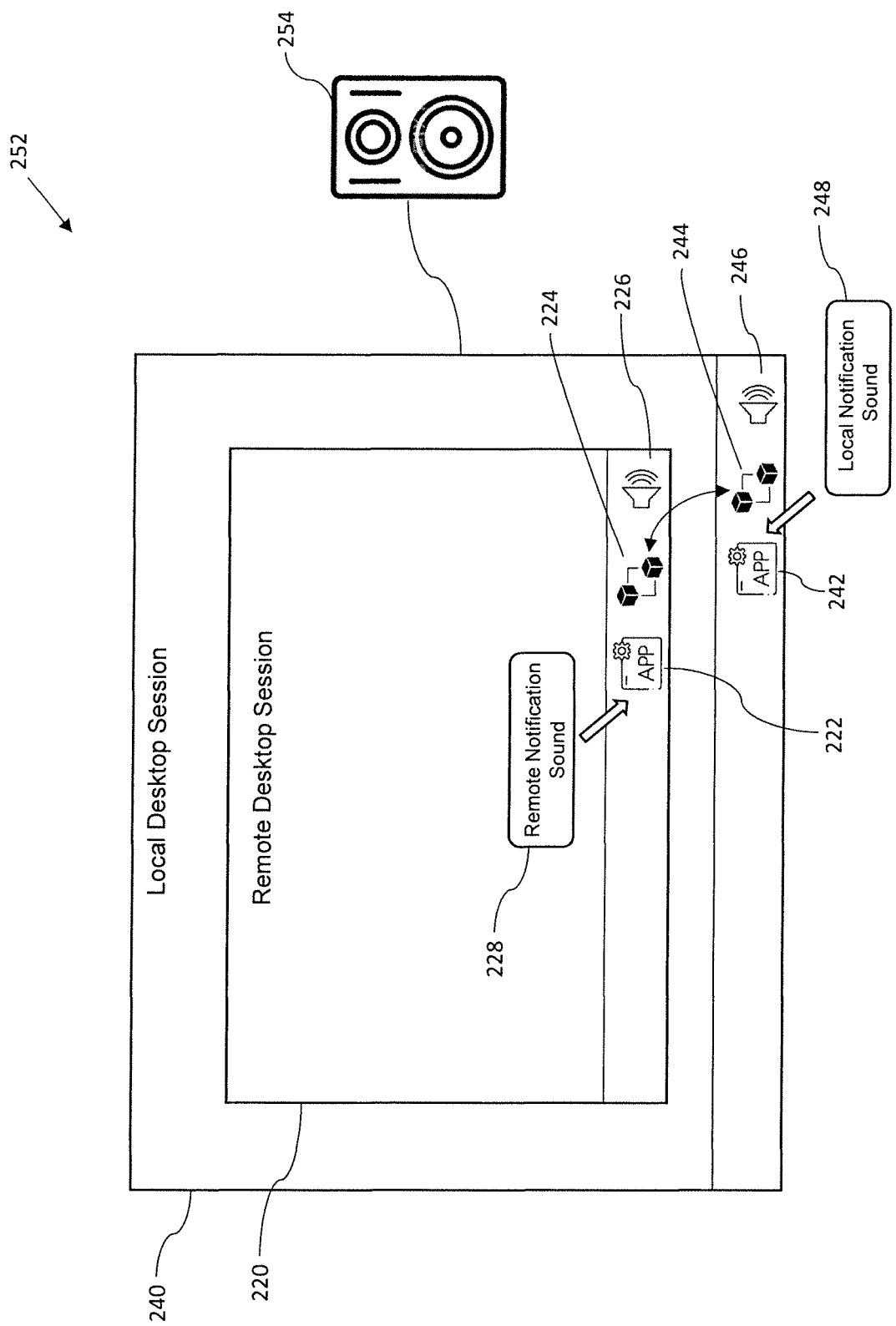
FIG. 7 is the display for the client computing device in FIG. 6 with the remote desktop session being displayed within the local desktop session.

The display 252 displaying the remote desktop session 220 and the local desktop session 240 is provided in FIG. 7. A collaboration exists between the local sound controller 244 and the remote sound controller 224 when the same application 222, 242 is running in both the local and remote desktop sessions 240, 220. When a respective notification sound 248, 228 is triggered in the local and remote desktop sessions 240, 220, the local and remote sound controllers 244, 224 cooperate with one another to mute one of the notification sounds.

The local desktop session 240 may be a Windows 10 session, for example. Similarly, the remote desktop session 220 may also be a Windows 10 session, for example.

The local app 242 is represented by an app icon displayed within the local desktop session 240, and is configured to generate local notification sounds 248. The local operating system for the client computing device 230 includes a local sound controller 244 and a local volume mixer 246, which are both represented by icons. The local sound controller 244 is a software component that is installed by the user or administrator and runs in the local operating system.

The local volume mixer 246 is used to control the volume of any of the local apps installed on the client computing device 230, such as local app 242. The local sound controller 244 interfaces between the local app 242 and the local volume mixer 246 to manage the local notification sounds 248 generated by the local app 242.

The remote desktop session 220 is launched by the user from within the local desktop session 240. The remote app 222 is represented by an app icon displayed within the remote desktop session 220, and is configured to generate remote notification sounds 228. The remote operating system for the remote desktop session 220 includes a remote sound controller 224 and a remote volume mixer 226, which are both represented by icons. The remote sound controller 224 is a software component that is installed by the user or administrator and runs in the remote operating system.

The remote volume mixer 226 is used to control the volume of any of the remote apps installed on the remote desktop session 220, such as remote app 222. The remote sound controller 224 interfaces between the remote app 222 and the remote volume mixer 226 to manage the remote notification sounds 228 generated by the remote app 222.

As will be discussed in greater detail below, the local and remote sound controllers 244, 224 cooperate with one another to mute one of the notification sounds 248, 228 based on predetermined muting criteria.

Figure 8:
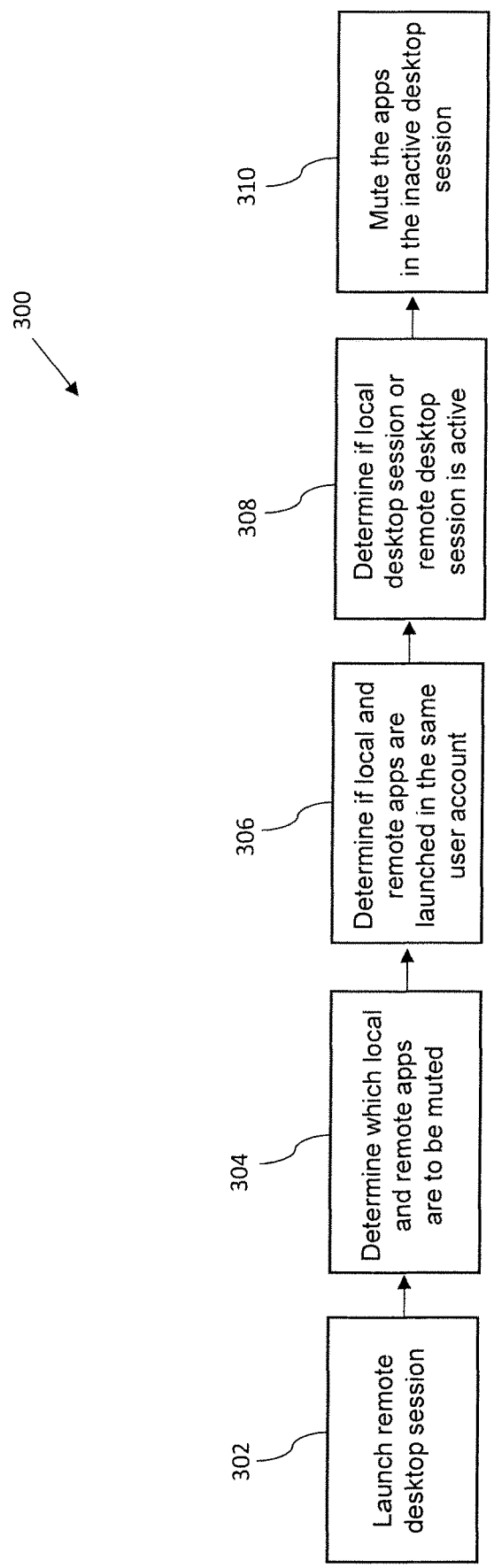
FIG. 8 is a flow diagram of one approach to avoid duplicated app notification sounds for the computing system illustrated in FIG. 6.

One approach on implementing the predetermined muting criteria will be discussed in reference to the flow diagram 300 in FIG. 8. This approach is based on determining which app 222, 242 is actively being used by the user. The notification sound for the app that is not being actively used will be muted, whereas the notification sound for the app that is being actively used will be received by the corresponding volume mixer for interfacing with the speaker 254.

In Block 302, a remote desktop session 220 is launched from the local desktop session 240 through a virtual desktop client 260.

In Block 304, a determination is made on which apps should be muted. A user interface for the virtual desktop client 260 allows a user to configure which apps should be detected and muted when both are launched in the local and remote desktop sessions 240, 220.

For example, the user interface shows which apps are to be launched in the local desktop session 240, and which apps are to be launched in the remote desktop session 220. The user then selects which apps are to be muted. The same messaging app and email app may both be launched in the local and remote desktop sessions 240, 220. Other app types that generate notification sounds may also be selected by the user to be muted as well. The remote sound controller 224 obtains this configuration and sends it to the local sound controller 244.

In Block 306, a determination is made on if the local and remote apps 242, 222 are launched with the same user account. There may be a scenario where a remote app is launched by user A but the local app is launched by user B. In this case, duplicated app notification sounds cannot be prevented.

The remote sound controller 224 obtains which remote apps have been launched in the remote desktop session 220. Similarly, the local sound controller 244 obtains which local apps have been launched in the local desktop session 240. The remote sound controller 224 communicates this information to the local sound controller 244.

In response to the same apps being launched in the local and remote desktops 240, 220, the next step is to determine if the same user account was used. This determination may be made using two different approaches.

One approach to determine if the same user account was used is based on querying the respective app logs of the local and remote apps 242, 222. An application log is a file that contains information about events that have occurred within an app. These events are logged by the app which are then written to the file. The file includes a current user of the app.

The local sound controller 244 queries the app log of the local app 242 to obtain the current user. The remote sound controller 224 queries the app log of the remote app 222 to obtain the current user. The remote sound controller 224 communicates this information to the local sound controller 244.

If the current users are the same, then a determination is made that the same user login was used to launch the local and remote apps 242, 222. This determination may be made by the local sound controller 244 after receiving the current user from the remote sound controller 224.

The other approach to determine if the same user account was used is based on querying packets of the respective local and remote apps 242, 222. Details in the packets can provide the entire network traffic for a particular point in time, such as the current user of an app.

The local sound controller 244 queries the packets of the local app 242 to obtain the current user. The remote sound controller 224 queries the packets of the remote app 222 to obtain the current user. If the packets are encrypted, then decryption is required before the packets can be analyzed. The remote sound controller 224 communicates this information to the local sound controller 244.

If the current users are the same, then a determination is made that the same user login was used to launch the local and remote apps 242, 222. This determination may be made by the local sound controller 244 after receiving the current user from the remote sound controller 224.

For each of the above approaches to determine if the same user account was used to launch the local and remote apps 242, 222, querying of the file or packets is periodically performed. This periodic polling is used to detect if new apps are launched or if existing apps have been closed.

In Block 308, a determination is made on if the local desktop session 240 is active or if the remote desktop session 220 is active. An active session means that the user is currently working in this session now.

The local sound controller 244 detects is the local desktop session 240 is active or inactive. The remote sound controller 224 detects if the remote desktop session 220 is active or inactive. The remote sound controller 224 communicates this information to the local sound controller 244.

Detecting which session is active may be determined by using an API of the operating system. For a Windows operating system, the API is GetForegroundWindow( ). This API detects which session is top-most.

If the virtual desktop client 260 is top-most, then a determination can be made that the remote desktop session 220 is an active session while local desktop session 240 is an inactive session. This step is periodically repeated to detect if the user has switched between the sessions.

In Block 310, the apps in the inactive session are muted. If the remote desktop session 220 is active, then the remote sound controller 224 passes notification sounds 228 generated by the remote app 222 to the remote volume mixer 226 to be heard by the user. With the local desktop session 240 being inactive, then the local sound controller 424 will mute notification sounds 248 generated by the local app 242 at the local volume mixer 246.

Figure 9:
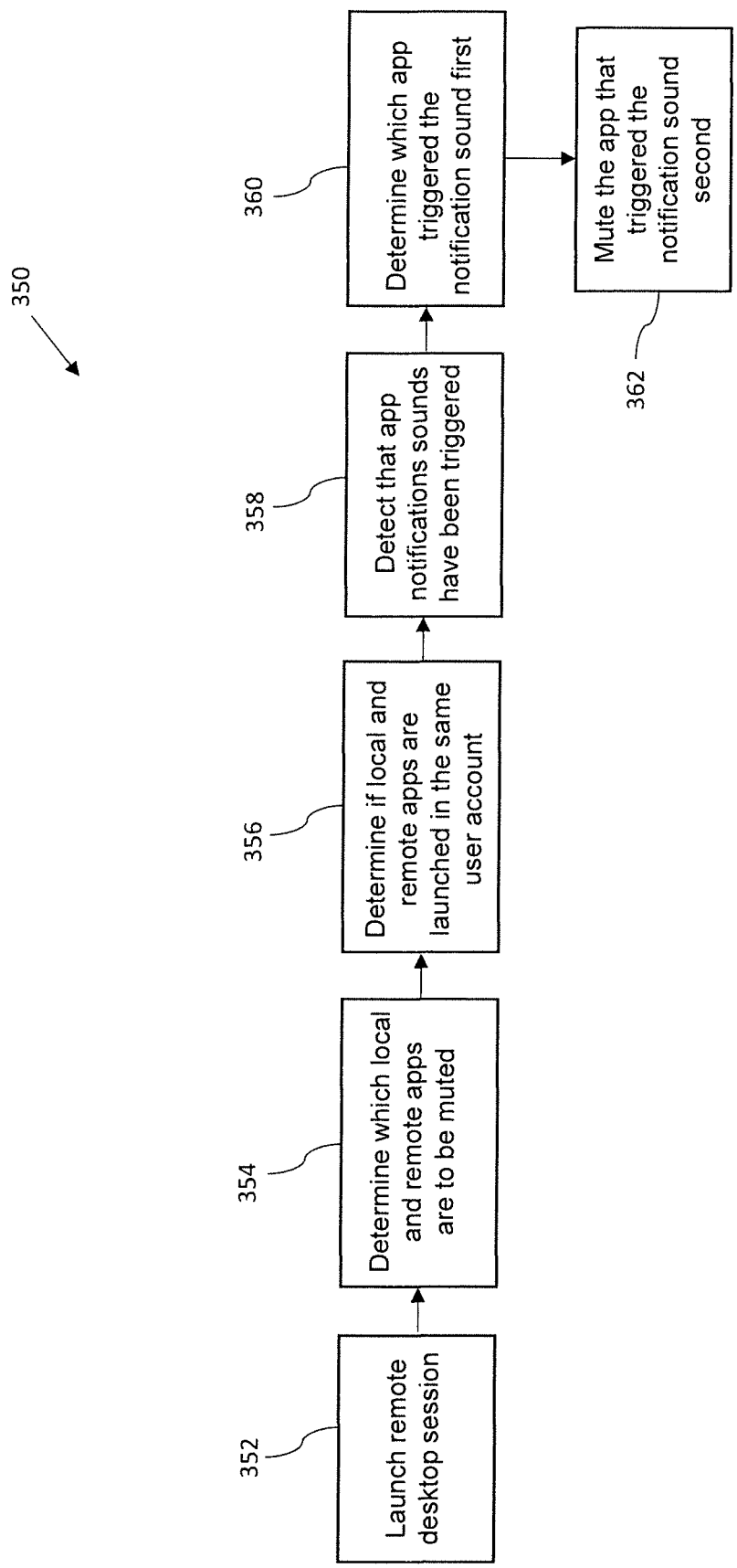
FIG. 9 is a flow diagram of another approach to avoid duplicated app notification sounds for the computing system illustrated in FIG. 6.

Another approach on implementing the predetermined muting criteria will be discussed in reference to the flow diagram 350 in FIG. 9. This approach is based on determining which app 222, 242 first generated or triggered the notification sound. The app that first triggered the notification sound will be heard by the user, while the notification sound triggered by the other app is muted.

The above steps in Blocks 302-306 are repeated below for Blocks 352-356. In Block 352, a remote desktop session 220 is launched from the local desktop session 240 through a virtual desktop client 260.

In Block 354, a determination is made on which apps should be muted. A user interface for the virtual desktop client 260 allows a user to configure which apps should be detected and muted when both are launched in the local and remote desktop sessions 240, 220.

For example, the user interface shows which apps are to be launched in the local desktop session 240, and which apps are to be launched in the remote desktop session 220. The user then selects which apps are to be muted. The same messaging app and email app may both be launched in the local and remote desktop sessions 240, 220. Other app types that generate notification sounds may also be selected by the user to be muted as well. The remote sound controller 224 obtains this configuration and sends it to the local sound controller 244.

In Block 356, a determination is made on if the local and remote apps 242, 222 are launched with the same user account. There may be a scenario where a remote app is launched by user A but the local app is launched by user B. In this case, duplicated app notification sounds cannot be prevented.

The remote sound controller 224 obtains which remote apps have been launched in the remote desktop session 220. Similarly, the local sound controller 244 obtains which local apps have been launched in the local desktop session 240. The remote sound controller 224 communicates this information to the local sound controller 244.

In response to the same apps being launched in the local and remote desktops 240, 220, the next step is to determine if the same user account was used. This determination may be made using two different approaches.

One approach to determine if the same user account was used is based on querying the respective app logs of the local and remote apps 242, 222. An application log is a file that contains information about events that have occurred within an app. These events are logged by the app which are then written to the file. The file includes a current user of the app.

The local sound controller 244 queries the app log of the local app 242 to obtain the current user. The remote sound controller 224 queries the app log of the remote app 222 to obtain the current user. The remote sound controller 224 communicates this information to the local sound controller 244.

If the current users are the same, then a determination is made that the same user login was used to launch the local and remote apps 242, 222. This determination may be made by the local sound controller 244 after receiving the current user from the remote sound controller 224.

The other approach to determine if the same user account was used is based on querying packets of the respective local and remote apps 242, 222. Details in the packets can provide the entire network traffic for a particular point in time, such as the current user of an app.

The local sound controller 244 queries the packets of the local app 242 to obtain the current user. The remote sound controller 224 queries the packets of the remote app 222 to obtain the current user. If the packets are encrypted, then decryption is required before the packets can be analyzed. The remote sound controller 224 communicates this information to the local sound controller 244.

If the current users are the same, then a determination is made that the same user login was used to launch the local and remote apps 242, 222. This determination may be made by the local sound controller 244 after receiving the current user from the remote sound controller 224.

For each of the above approaches to determine if the same user account was used to launch the local and remote apps 242, 222, querying of the file or packets is periodically performed. This periodic polling is used to detect if new apps are launched or if existing apps have been closed.

In Block 358, a determination is made that the app notification sounds have been triggered. The local sound controller 244 detects when the local app 242 triggers a notification sound 248. The remote sound controller 224 detects when the remote app 222 triggers a notification sound 228. Only the notification sounds for the apps marked in the user configured list as discussed above will be detected.

In Block 360, a determination is made on which app triggered the notification sound first. The remote sound controller 224 communicates a time when the remote notification sound 228 was triggered to the local sound controller 244.

The local sound controller 244 compares the time when the remote notification sound 228 was triggered to the time when the local notification sound 248 was triggered. The local sound controller 244 communicates back to the remote sound controller 224 on which notification sound was triggered first.

In Block 362, the app that triggered the notification sound second is muted by the corresponding sound controller associated with that app. The app that triggered the notification sound first is passed to the corresponding volume mixer associated with that app. The muted app is muted for a predetermined amount of time. If the notification sound is not muted fast enough, a partially duplicated notification sound heard by the user.

Figure 10:
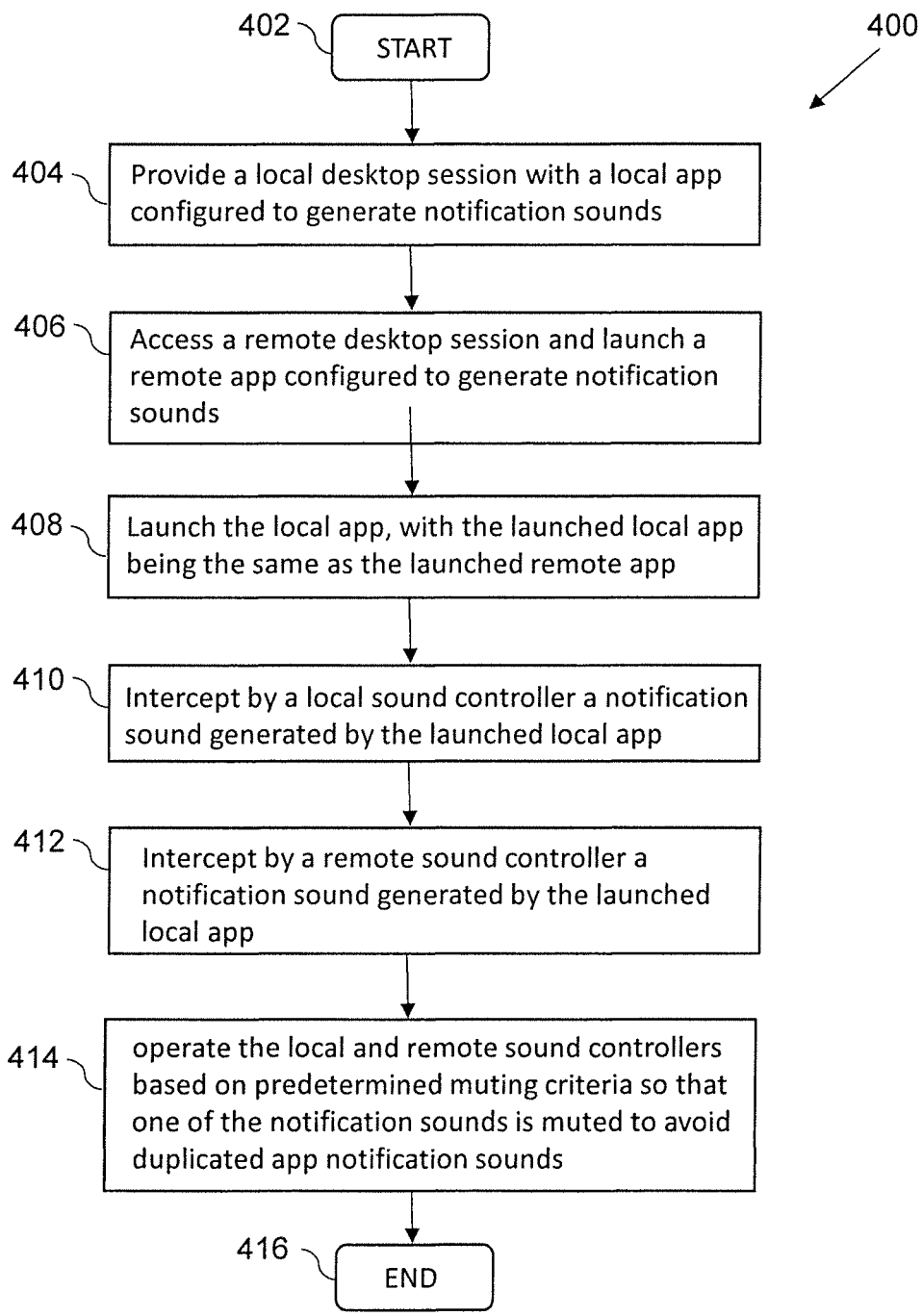
FIG. 10 is a flow diagram on operating the client computing device illustrated in FIG. 6.

Referring now to FIG. 10, a flow diagram 400 for operating the above-described client computing device 230 will be discussed. From the start (Block 402), a local desktop session 240 with a local app 242 configured to generate notification sounds 248 is provided at Block 402. A remote desktop session 220 is accessed and a remote app 222 configured to generate notification sounds 228 at Block 406. The local app 242 is launched at Block 408, with the launched local app 242 being the same as the launched remote app 222. A local sound controller 244 intercepts a notification sound 248 generated by the launched local app 242 at Block 410. A remote sound controller 224 intercepts a notification sound 228 generated by the launched remote app 222 at Block 412. The local and remote sound controllers 244, 224 are operated at Block 414 based on predetermined muting criteria so that one of the notification sounds is muted to avoid duplicated app notification sounds. The method ends at Block 416.

Furthermore, other aspects of the computing system and the client computing devices may take the form of a computer program product stored by one or more computer-readable storage media having computer-readable program code, or instructions, embodied in or on the storage media, for operation thereof. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing system comprising:
   a virtual server configured to provide a remote desktop session based on a remote operating system that includes a remote volume mixer and a remote sound controller, with the remote desktop session providing at least one remote app configured to generate notification sounds for the remote volume mixer;
   a client computing device configured to provide a local desktop session based on a local operating system that includes a local volume mixer and a local sound controller, with the local desktop session providing at least one local app configured to generate notification sounds for the local volume mixer;
   said client computing device further configured to perform the following:
      access the remote desktop session and launch one of the at least one remote apps,
      launch one of the at least one local apps, with the launched local app being the same as the launched remote app, and
      intercept by the local sound controller a notification sound generated by the launched local app while the remote sound controller is also intercepting a corresponding notification sound generated by the launched remote app; and
   with the local and remote sound controllers each configured to operate based on predetermined muting criteria so that one of the notification sounds is muted at the local or remote volume mixer in order to avoid duplicated app notification sounds.

2. The computing system according to claim 1 wherein the predetermined muting criteria is based on determining which one of the local and remote apps is operating in an active session and which one of the local and remote apps is operating in an inactive session, with the notification sound being muted for the inactive session.

3. The computing system according to claim 2 wherein a foreground window corresponds to the active session and a background window corresponds to the inactive session, with the local sound controller being used to determine if the local app is in the foreground window or the background window while the remote sound controller is being used to determine if the remote app is in the foreground window or the background window.

4. The computing system according to claim 1 wherein the predetermined muting criteria is based on determining which one of the local and remote apps triggered the notification sound first, with the notification sound being muted for the app that triggered the notification sound second.

5. The computing system according to claim 4 wherein the local sound controller is used to determine a time when the notification sound was triggered by the local app while the remote sound controller is used to determine a time when the notification sound was triggered by the remote app, with the local and remote sound controllers coordinating the respective times with one another to determine which app triggered the notification sound first.

6. The computing system according to claim 1 wherein said client computing device further includes a user interface (UI) for a user to determine which of the at least one local and remote apps are to be muted when the same app is launched in the local and remote desktop sessions.

7. The computing system according to claim 1 wherein said client computing device is further configured to determine that the local and remote apps were launched using a same user account login before the local and remote sound controllers are operated based on the predetermined muting criteria.

8. The computing system according to claim 7 wherein said client computing device is further configured perform the following:
operating the local sound controller to query a log of the local app to determine a current user of the local app while the remote sound controller queries a log of the remote app to determine a current user of the remote app;
with a comparison of the current users being made by one of the sound controllers to determine that the same user account login was used to launch the local and remote apps.

9. The computing system according to claim 8 wherein the logs are periodically queried by the respective local and remote sound controllers to detect if new local and remote apps have been launched or if existing local and remote apps have been closed.

10. The computing system according to claim 7 wherein said client computing device is further configured perform the following: operating the local sound controller to query one or more packets of the local app to determine a current user of the local app while the remote sound controller queries one or more packets of the remote app to determine a current user of the remote app; with a comparison of the current users being made by one of the sound controllers to determine that the same user account login was used to launch the local and remote apps.

11. The computing system according to claim 10 wherein the packets are periodically queried by the respective local and remote sound controllers to detect if new local and remote apps have been launched or if existing local and remote apps have been closed.

12. A client computing device comprising:
a memory and a processor coupled to said memory and configured to perform the following:
provide a local desktop session based on a local operating system that includes a local volume mixer and a local sound controller, with the local desktop session providing at least one local app configured to generate notification sounds for the local volume mixer,
access a remote desktop session based on a remote operating system that includes a remote volume mixer and a remote sound controller, with the remote desktop session providing at least one remote app configured to generate notification sounds for the remote volume mixer,
launch one of the at least one remote apps,
launch one of the at least one local apps, with the launched local app being the same as the launched remote app, and
intercept by the local sound controller a notification sound generated by the launched local app while the remote sound controller is also intercepting a corresponding notification sound generated by the launched remote app,
with the local and remote sound controllers each configured to operate based on predetermined muting criteria so that one of the notification sounds is muted at the local or remote volume mixer in order to avoid duplicated app notification sounds.

13. The client computing device according to claim 12 wherein the predetermined muting criteria is based on determining which one of the local and remote apps is operating in an active session and which one of the local and remote apps is operating in an inactive session, with the notification sound being muted for the inactive session.

14. The client computing device according to claim 13 wherein a foreground window corresponds to the active session and a background window corresponds to the inactive session, with the local sound controller being used to determine if the local app is in the foreground window or the background window while the remote sound controller is being used to determine if the remote app is in the foreground window or the background window.

15. The client computing device according to claim 12 wherein the predetermined muting criteria is based on determining which one of the local and remote apps triggered the notification sound first, with the notification sound being muted for the app that triggered the notification sound second.

16. The client computing device according to claim 15 wherein the local sound controller is used to determine a time when the notification sound was triggered by the local app while the remote sound controller is used to determine a time when the notification sound was triggered by the remote app, with the local and remote sound controllers coordinating the respective times with one another to determine which app triggered the notification sound first.

17. The client computing device according to claim 12 further includes a user interface (UI) for a user to determine which of the at least one local and remote apps are to be muted when the same app is launched in the local and remote desktop sessions.

18. A method comprising:
providing a local desktop session based on a local operating system that includes a local volume mixer and a local sound controller, with the local desktop session providing at least one local app configured to generate notification sounds for the local volume mixer;

accessing a remote desktop session based on a remote operating system that includes a remote volume mixer and a remote sound controller, with the remote desktop session providing at least one remote app configured to generate notification sounds for the remote volume mixer;

launching one of the at least one remote apps;

launching one of the at least one local apps, with the launched local app being the same as the launched remote app; and intercepting by the local sound controller a notification sound generated by the launched local app while the remote sound controller is also intercepting a corresponding notification sound generated by the launched remote app;

with the local and remote sound controllers each configured to operate based on predetermined muting criteria so that one of the notification sounds is muted at the local or remote volume mixer in order to avoid duplicated app notification sounds.

19. The method according to claim 18 wherein the predetermined muting criteria is based on determining which one of the local and remote apps is operating in an active session and which one of the local and remote apps is operating in an inactive session, with the notification sound being muted for the inactive session.

20. The method according to claim 18 wherein the predetermined muting criteria is based on determining which one of the local and remote apps triggered the notification sound first, with the notification sound being muted for the app that triggered the notification sound second.

* * * * *